Sept. 9, 1958     D. E. BOONE     2,851,674
SAFETY SIGNAL FOR TRUCKS, TRUCK TRAILERS AND THE LIKE
Filed Sept. 30, 1957
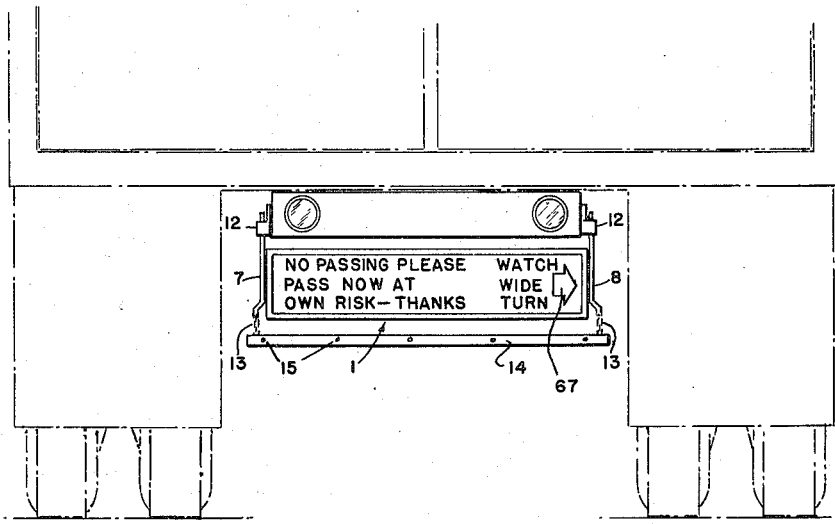
FIG. 1
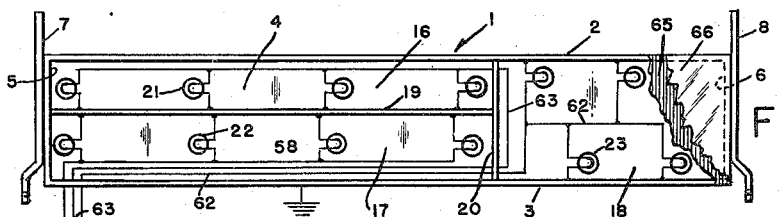
FIG. 2
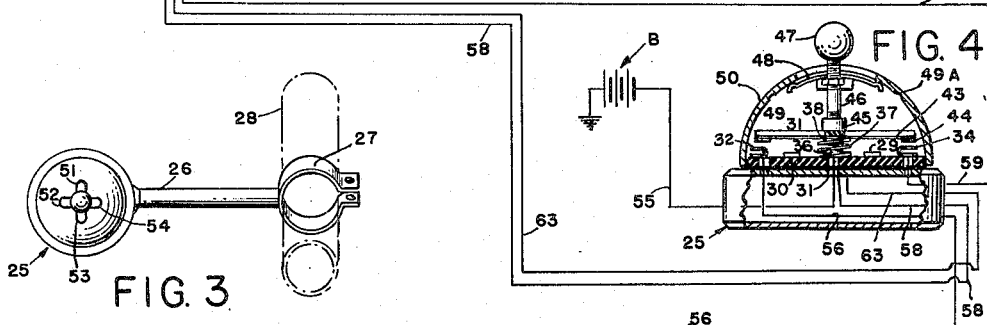
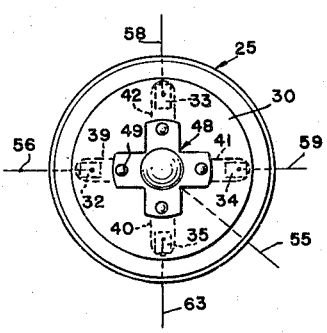
FIG. 3
FIG. 5
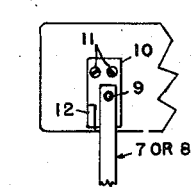
FIG. 6
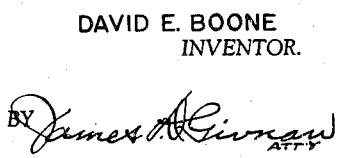
FIG. 7
DAVID E. BOONE
INVENTOR.
BY James A. Gorman
ATTY

United States Patent Office 2,851,674
Patented Sept. 9, 1958

2,851,674

SAFETY SIGNAL FOR TRUCKS, TRUCK TRAILERS AND THE LIKE

David E. Boone, Beaverton, Oreg.

Application September 30, 1957, Serial No. 686,907

2 Claims. (Cl. 340—106)

This invention relates generally to signalling apparatus for motor vehicles, and more particularly to a signalling device for use on trucks, truck trailers and similar vehicles which because of their size and length require more space in negotiating right-hand and left-hand turns than smaller vehicles.

In negotiating a right-hand turn, for example, large trucks are compelled to start the turn from an inside lane and cut across the outside lane in order to complete the turn without running over corner sidewalks. This procedure has proved exceedingly hazardous to following vehicles whose drivers are not familiar with the procedure. This problem is seriously aggravated when the conventional turn-indicating signals on the truck become dim or obscured in bright daylight or by road splash or other impediments.

Another hazard is the temptation for fast moving vehicles to pass slower moving vehicles sometimes under conditions as above pointed out and more often under conditions of restricted visibility. In either case collisions with serious accompanying property damage and sometimes loss of life are often the result.

Accordingly, therefore, it is one of the principle objects of my invention to provide a signalling device expediting the passing of automotive vehicles by indicating in a clear and positive manner to a following driver an intended or anticipated maneuver of the vehicle being overtaken and the safe or unsafe traffic conditions ahead with regard to passing or not passing.

Another object is the provision of a signalling device of this character which is operable by day as well as by night and whose import is obvious even to the most uninstructed driver.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a fragmentary view representing in broken lines the rear end of a truck or truck trailer showing my signal cabinet suspended from a rear frame member of the truck or trailer chassis.

Figure 2 is a front view on an enlarged scale of the signal cabinet removed from the truck and with its coverplate removed, except for a fragment thereof, to disclose internal illuminating means and a wiring diagram therefor.

Figure 3 is a detail plan view of a switch control unit and housing adapted for attachment to the steering column of the truck.

Figure 4 is a fragmentary sectional view of a 4-way switch within the housing of Figure 3 and a wiring diagram showing its electrical connections to the illuminating means of Figure 2 and to a pair of standard right and left turn signals represented by Figure 5 and adapted for mounting on the truck fame or body in the conventional manner.

Figure 6 is a top plan view of the switch of Figure 4 with its housing removed.

Figure 7 is a fragmentary detail view on an enlarged scale of one of two pivotal supports for the signal cabinet.

With continuing reference to the drawing wherein like numerals of reference represent corresponding parts: reference number 1 indicates generally a signal cabinet made entirely of metal and comprising top and bottom walls 2 and 3, a rear wall 4 and side walls 5 and 6. The cabinet is secured by bolting, riveting or spot welding its side walls to a pair of arms 7 and 8 whose top ends as shown in Figure 7 are pivotally attached as at 9 to and suspended from brackets 10 secured as at 11 to the truck chassis and each provided with an abutment 12 to prevent rearward swinging of the cabinet relative to the truck frame but to allow it to swing forwardly as a means of protecting the cabinet when accidentally striking objects during rearward maneuvering of the truck. The bottom ends of the arms 7 and 8 are provided with chains 13 to which is attached a cross arm 14 having tapped holes 15 therein for the attachment of one or more license plates.

The cabinet is made entirely of metal electrically grounded to the truck frame and divided into compartments indicated at 16, 17 and 18 by metallic partitions 19 and 20. Secured in a conventional manner to the back wall 4 of the cabinet and within the compartment 16 is a series of lamps 21. Similarly mounted within the compartments 17 and 18 respectively is a series of lamps 22 and 23. One side of the lamps in each series is grounded to the cabinet. The 4-way switch, as best illustrated in Figures 4 and 6, comprises a hollow base indicated generally at 25 secured to and in open communication with the outer end of a hollow tubular arm 26 whose opposite end is secured to a clamp 27 by means of which the arm can be secured to the steering column 28 of a truck or other vehicle.

Superimposed upon the base and secured thereto as at 29 is a disc 30 of dielectric material having openings 31 therethrough adjacent electrical contacts 32, 33, 34 and 35 secured to the disc. Formed centrally of the disc 30 is a vertical projection 36 surrounded by one end of a compression spring 37 whose opposite end surrounds a similar downward projection 38 from the intersection of a spider of dielectric material having four arms 39, 40, 41 and 42. The projection 38 also extends through an opening through the intersection of an electrical conductor also in the form of a spider having arms 43 matching those of the first mentioned spider and provided with contacts 44 at their outer ends. Extending upwardly from the disc 30 is an internally threaded projection 45 to which is threadedly attached a shaft 46 also threaded at its top and provided with a finger grip 47 and a detent 48 made of spring material and having four radiating arms each provided at its outer end with a nodule 49 adapted for selective engagement with recesses 49A formed in the inner wall of a semi-circular hood or housing 50 secured to the disc in any approved manner. The top of the hood is provided with four radiating slots indicated at 51, 52, 53 and 54 through which the shaft 46 is movable for selectively contacting the contacts 44 of arms 43 with the contacts 32—35 on the disc 30. As shown in Figure 4 one side of the truck battery B, is grounded and its opposite side is connected by wire 55 to the spring 37 and thereby to the arms of the conductor 43. Switch contact 32 (see also Figure 6) is connected by wire 56 to one side of a left turn indicating signal 57 whose opposite side is grounded as shown. Switch contact 33 is connected by wire 58 with the series of lamps 22 within compartment 17 of the signal cabinet. Contact 34 is connected by wires 59 and 60 to one side of the right turn indicating signal 61 and by wire 62 to one side of the lamps 23 in the compartment 18. Contact 35 is connected by wire 63 to one side of the series of lamps 21 within the compartment 16.

As shown in Figure 2 the front of the cabinet is first covered with a sheet of colored translucent material such as cellophane, plastic or the like as indicated at 65 and also a coverplate of translucent glass 66. That area of the glass 66 confronting the compartment 16 of the cabinet is provided with the words "No Passing Please"; that confronting compartment 17 with the words "Pass Now At Own Risk—Thanks" and that confronting compartment 18 with the words "Watch Wide Turn" and an arrow 67 pointing to the right. As is conventional the words may either be cut from a stencil attached to the glass or they may be formed in any other desired manner in which these words would become visible upon illumination from within the casing. For reasons which will later become apparent, it is intended that the words of compartments 16 and 18 be illuminated in red to signify danger and those of compartment 17 in either green or amber.

From the foregoing it will be apparent that forward movement of the switch shaft 46 in slot 51 of hood 50 will close the circuit from the source through contact 33 and wire 58 to illuminate compartment 17 to signal a following driver that he can pass the truck but at his own risk. Moving the shaft 46 rearwardly will similarly close the circuit through contact 35 and wire 63 to illuminate compartment 16 of the signal cabinet and thereby warn a following driver against passing the truck. Movement of the switch shaft to the right and thereby closing the circuit through contact 34 wires 59, 60 and 62 will, respectively, illuminate the right turn indicating signal 61 and also the lamps in compartment 18 whose illumination will caution a following driver against a wide turn about to be negotiated by the truck. The circuit to the right turn signal and to the compartment 18 may include a conventional circuit breaker (not shown) to cause both signals to flash intermittently in the conventional manner. Or, if desired, the circuit breaker could be connected in circuit with the battery B and the spring 37 to cause each series of lamps to flash when energized. The left turn indicating signal 57 is actuated by moving the shaft 46 to the left and thereby closing the circuit from the source through contact 32 and wire 56 to the indicator. The switch shaft 46 will be held in any selected circuit-closing position by spring engagement of the nodules 49 on the spring detent 48 with the recesses 49A on the inside wall of the hood 50, or held in a neutral position by spring contact of the nodules with the underside of the hood between the nodules.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A signalling device of the class described comprising in combination a cabinet adapted to be suspended from a vehicle frame at the rear end thereof, said cabinet being made of metal divided into a plurality of compartments and electrically grounded to the frame of a vehicle, a series of electric lamps in each of said compartments having one of their sides grounded to the cabinet, a cover plate for said cabinet provided with warning indicia visible from a distance rearwardly of the vehicle, left and right turn indicating signals adapted to be mounted upon and grounded at one of their sides to the frame of the vehicle at the rear end thereof, a switch adapted for mounted at the forward end of the vehicle body, said switch comprising a plurality of fixed electrical contacts in circuit with said series of lamps within the cabinet and with said left and right turn indicating signals, a plurality of movable contacts contained within said switch and operable by a single actuator, said movable contacts being in circuit with a source of electrical energy carried by the vehicle and having one of its sides electrically grounded thereto, a housing for said switch having radiating guide slots therein for the passage of said actuator therethrough and therealong for actuating said movable contacts and selectively energizing certain of said series of lamps within said cabinet and another series of said lamps simultaneously with said right turn indicator and said left turn indicator independent of all of said lamps.

2. A signalling device as claimed in claim 1 wherein said switch housing has radially disposed recesses formed therein, a cruciform detent carried by said actuator and adapted for engagement with said detents at the end of its passage through any of said slots for maintaining certain of said movable contacts in contact with certain of said fixed contacts.

No references cited.